Aug. 2, 1960 J. R. McPHEE, JR 2,947,807

CHROMINANCE-SIGNAL SELECTION SYSTEM

Filed April 20, 1955 2 Sheets-Sheet 1

Aug. 2, 1960 J. R. McPHEE, JR 2,947,807

CHROMINANCE-SIGNAL SELECTION SYSTEM

Filed April 20, 1955 2 Sheets-Sheet 2

United States Patent Office 2,947,807

Patented Aug. 2, 1960

2,947,807

CHROMINANCE-SIGNAL SELECTION SYSTEM

Joseph R. McPhee, Jr., Garden City, N.Y., assignor to Hazeltine Research, Inc., Chicago, Ill., a corporation of Illinois Filed Apr. 20, 1955, Ser. No. 502,643

11 Claims. (Cl. 178—5.4)

*General*

This invention relates to systems for selecting chrominance signals along predetermined axes of a received chrominance subcarrier wave signal and, particularly, to systems employing quadrature selection devices for selecting signals along nonquadrature axes.

In color-television receivers employing one-gun picture tubes, such as described in an article entitled "Processing of the NTSC Color Signal for One-Gun Sequential Color Displays," at pages 299–308, inclusive, of the Proceedings of the I.R.E. for January 1954, the conventional NTSC video-frequency signal is converted into one which will result in a faithful reproduction when applied to the particular type of single-gun picture tube being employed. A specific form of picture tube considered in such article, commonly known as the Chromatron, has repeating groups of horizontal phosphor strips, A focus mask grid structure adjacent the phosphor strips controls the duration and sequence of excitation of these strips by the electron beam to reproduce color images. The NTSC chrominance subcarrier wave signal is modulated in quadrature by $R-Y$ and $B-Y$ components and, in a well-known type of color-television receiver, these components or components from which they may be developed are derived prior to application to the picture tube and eventually utilized to excite, respectively, red and blue phosphors in the picture tube. In such a receiver, a signal $G-Y$ representative of green is developed from the $R-Y$ and $B-Y$ components and eventually utilized to excite the green phosphors. These color-difference signals and a luminance signal Y combine to reproduce the televised color image.

In the above-described focus mask type of single-gun tube, the derivation of the modulation components of the subcarrier wave signal occurs within the picture tube. The components required in such case, as more fully considered in the above-mentioned I.R.E. article, are, in addition to modified luminance components, composite components commonly designated as $R-B$ and $G-M$, where $M=⅓G+⅓B+⅓R$. As employed in the picture tube, these modulation components have specific phase relations different from their relations on the NTSC subcarrier wave signal and occur in a specific sequence also different from that on the NTSC subcarrier wave signal. As described in the above-mentioned I.R.E. article and in a copending application Serial No. 384,237, now Patent No. 2,734,940 entitled "Image-Reproducing System for a Color-Television Receiver," filed by Bernard D. Loughlin, on October 5, 1953, the NTSC subcarrier wave signal may be processed to provide the desired signal for the single-gun picture tube by selecting the modulation components along the $R-B$ and $G-M$ axes of the chrominance subcarrier wave signal. These axes are separated on such subcarrier wave signal by approximately 70°. The selected components are then combined and applied to the picture tube so that they occur with proper relative timing and in proper sequence with relation to the impingement of the electron beam on the different phosphors in the tube.

Quadrature axis selection is usually simpler to practice than selection at acute or obtuse angles. However, if quadrature axis selection is used to select the $R-B$ and $G-M$ components, since these components are separated by only 70°, there is some contamination of each one by the other or, if the modulation phase for one of the components is aligned with one of the axes of the selecting device, then the other component is contaminated by the one. This results in improper colors in the reproduced image. It is desirable, therefore, to provide a simple and relatively inexpensive chrominance-signal selection system including a quadrature axis selector for selecting the $R-B$ and $G-M$ components without the above-described contamination.

It is, therefore, an object of the present invention to provide a chrominance-signal selection system including a quadrature axis selector for the $R-B$ and $G-M$ signals which avoids the above-mentioned limitations of other systems.

It is a further object of the present invention to provide a chrominance-signal selection system including a quadrature axis selector for $R-B$ and $G-M$ components in which a minimum of contamination of one of these components by the other occurs.

It is also an object of the present invention to provide a chrominance-signal selection system for $R-B$ and $G-M$ components which is simple and inexpensive.

It is a further object of the present invention to provide a relatively stable chrominance-signal selection system for selecting along a pair of nonquadrature axes of a chrominance subcarrier wave signal which is unusually stable.

It is, finally, an object of the present invention to provide a chrominance-signal selection system for $R-B$ and $G-M$ components which employs a minimum number of tubes.

In accordance with the present invention, a chrominance-signal selection system for a color-television receiver for selecting desired chrominance components along nonquadrature axes of a chrominance subcarrier wave signal comprises means for supplying such a chrominance subcarrier wave signal. The selection system also includes means including a quadrature axis selector responsive to the subcarrier wave signal and having a pair of output circuits for developing therein components along different ones of a pair of quadrature axes of said wave signal. In addition, the chrominance-signal selection system includes means including a phase-shift circuit responsive to the developed components having substantially a quadrature phase shift at the frequency of the wave signal and having an asymmetrical signal-transfer impedance. The phase-shift circuit couples the output circuits for combining in at least one of the output circuits specific proportions of the components along the quadrature-phase axes with substantially the same phase to develop the desired chrominance components in both output circuits.

For a better understanding of the present invention, together with other and further objects thereof, reference is had to the following description taken in connection with the accompanying drawings, and its scope will be pointed out in the appended claims.

Referring to the drawings.

Figure 2:
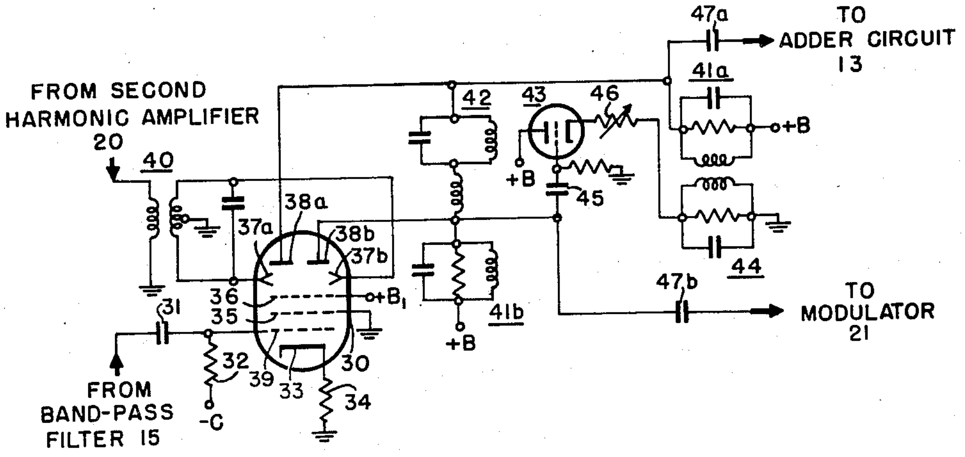
Fig. 2 is a detailed circuit diagram of one embodiment of such chrominance-signal selection system.
Figure 3A:
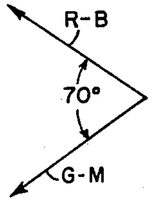
Figure 3B:
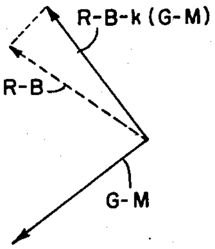
Figure 3C:
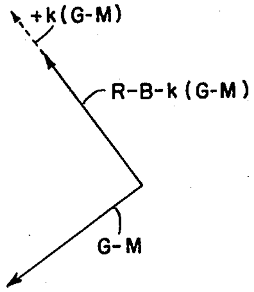
Figure 4:
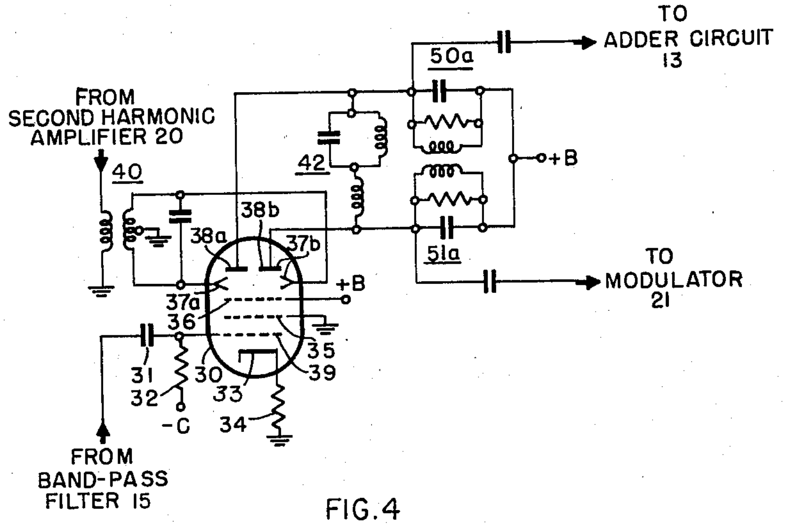
Figure 4A:
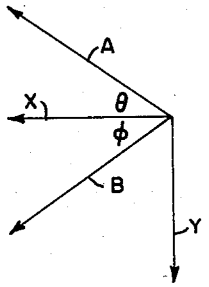
Figure 4B:
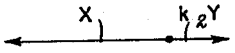
Figure 4C:
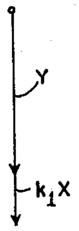

Figs. 3*a*, 3*b*, and 3*c* are vector diagrams useful in explaining the operation of the embodiment of Fig. 2;

Fig. 4 is another detailed circuit diagram of an additional embodiment of a chrominance-signal selection system in accordance with the invention, and Figs. 4*a*, 4*b*, and 4*c* are vector diagrams useful in explaining the operation of the embodiment of Fig. 4.

Figure 1:
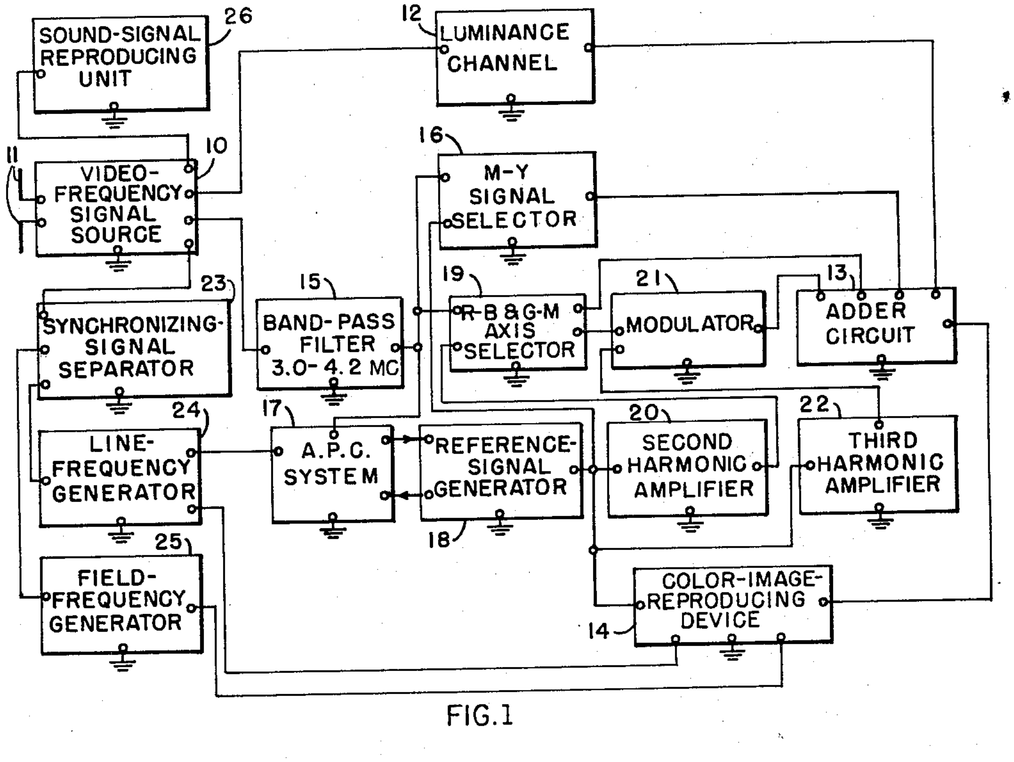
Fig. 1 is a schematic diagram of a color-television receiver including a chrominance-signal selection system constructed in accordance with the present invention.

*General description of color-television receiver of Fig. 1*

Referring now more particularly to Fig. 1 of the drawings, there is represented a color-television receiver of a compatible type suitable for utilizing an NTSC type of color-television signal. More particularly, such television receiver is of the type more fully described in the aforementioned I.R.E. article. Such receiver includes a video-frequency signal source 10 which may, for example, comprise a radio-frequency amplifier having an input circuit coupled to an antenna 11, an oscillator-modulator, an intermediate-frequency amplifier, and a video-frequency signal detector. An output circuit of the source 10 is coupled through a luminance channel 12 and an adder circuit 13, in cascade in the order named, to an input circuit of a color-image-reproducing device 14. The luminance channel 12 may be a conventional wide band amplifier having, for example, a pass band of approximately 0–3 megacycles. The adder circuit 13 may be any of a number of conventional types for linearly combining a plurality of signals to develop a composite signal. The image-reproducing device 14 is of the focus mask type previously described herein, one form of such tube being commonly known as a Chromatron.

An output circuit of the video-frequency signal source 10 is also coupled through a band-pass filter network 15 having a pass band of approximately 3.0–4.2 megacycles and an *M—Y* signal selector 16, in cascade in the order named, to an input circuit of the adder circuit 13. The *M—Y* signal selector 16 is of a type more fully described in the aforementioned I.R.E. article for developing a luminance-correction signal for combination with the luminance signal translated through the channel 12. The output circuit of the band-pass filter network 15 is also coupled through an automatic-phase-control system 17 to an input circuit of a reference-signal generator 18. The APC system 17 may be of a conventional type for accurately controlling the phasing of the signal developed in the generator 18 so that such signal is maintained in specific phase relation with respect to a color burst synchronizing signal translated through the filter network 15. The output circuit of the generator 18 is coupled to an input circuit of the *M—Y* signal selector 16 to effect derivation of the *M—Y* signal from the proper phase of the wave signal and to a color-switching circuit in the color-image-reproducing device 14 to control the timing of the impingement of the beam therein on the different color phosphors.

The output circuit of the band-pass filter network 15 is directly coupled, and that of the generator 18 is coupled through a second harmonic amplifier 20, to input circuits of the *R—B* and *G—M* axis selector 19, constructed in accordance with the present invention and to be described more fully hereinafter. The *R—B* signal output circuit of the selector 19 is coupled directly to the adder circuit 13 while the *G—M* signal output circuit of such selector is coupled through a modulator 21 to an input circuit of the adder 13, the generator 18 being coupled through a third harmonic amplifier 22 to an input circuit of the modulator 21.

An output circuit of the video-frequency signal source is also coupled through a synchronizing-signal separator 23 to input circuits of a line-frequency generator 24 and a field-frequency generator 25, output circuits of the latter generators being coupled, respectively, to horizontal and vertical deflection windings in the image-reproducing device 14. An output circuit of the generator 24, for example a winding on the horizontal deflection transformer therein, is coupled to an input circuit of the automatic-phase-control system 17 for gating such system into a responsive state during the period of the color burst synchronizing signal.

Another output circuit of the video-frequency signal source is coupled to a sound-signal reproducing unit 26 which may include, for example, a sound-signal intermediate amplifier, a signal detector, an audio-frequency amplifier, and a sound-signal reproducing device such as a loudspeaker.

All of the units thus far described, and their combination, with the exception of the *R—B* and *G—M* axis selector 19 may be of conventional construction well known in the color-television art and fully considered in the aforementioned I.R.E. article. Therefore, no more detailed description of such units is provided herein.

*General explanation of operation of color-television receiver of Fig. 1*

The video-frequency signal source 10 responds to a conventional NTSC type of color-television signal intercepted by the antenna system 11. In the source 10 such signal is selected, amplified at radio frequency, modified to an intermediate frequency, and further amplified, and the modulation components of the intermediate-frequency television signal are detected by means of a conventional detection system. Such modulation components comprise a composite color video-frequency signal and an intermediate-frequency sound signal. The composite video-frequency signal includes a luminance component, a chrominance subcarrier wave signal, and synchronizing components including line-frequency, field-frequency, and color burst synchronizing signals.

The derived luminance component is amplified in the channel 12 and applied to an input circuit of the adder circuit 13. The chrominance subcarrier wave signal, modulated at different phases by components representative of different basic colors of an image and also including a modulation component which may be utilized as a luminance-correction signal, is translated through the filter network 15 and applied to the *M—Y* signal selector 16 for derivation of the *M—Y* luminance-correction signal. This luminance-correction signal is combined with the luminance signal in the adder circuit 13 to develop a corrected luminance signal suitable for use to obtain at least first order constant luminance reproduction in a one-gun type of picture tube such as the Chromatron. The chrominance subcarrier wave signal is also applied to the axis selector 19 wherein, in a manner to be described more fully hereinafter, portions of the wave signal along the *R—B* phase axis are selected in one output circuit and other portions along the *G—M* axis are selected in another output circuit. The portions selected along the *R—B* axis, comprising a 3.58 megacycle wave signal including substantially only *R—B* information, are applied to the adder circuit 13. The selected portions along the *G—M* axis, comprising another 3.58 megacycle wave signal including substantially only *G—M* information, are applied to the modulator 21 wherein the 3.58 megacycle wave signal heterodynes with a third harmonic signal to develop a second harmonic subcarrier wave signal modulated at the proper phase angles by *G—M* information. The latter wave signal is applied to the adder circuit 13.

The color burst signal translated through the filter network 15 is utilized in the APC system 17 to control the phase of the locally generated signal developed in the generator 18. The signal developed in the generator 18, equal in frequency to that of the subcarrier wave signal, that is, having a frequency of approximately 3.58 megacycles, is doubled in frequency in the amplifier 20 and utilized in the selector 19, in a manner to be described more fully hereinafter, to effect the above-described selection. The locally generated signal is tripled in the harmonic amplifier 22 to provide the third harmonic signal used in the modulator 21. The signals applied to the adder circuit 13 are combined into a composite signal including the corrected luminance signal, the fundamental wave signal modulated by $R-B$ information, and the second harmonic signal modulated by $G-M$ information. The composite signal is applied to the device 14 to intensity modulate the electron beam therein. The signal developed in the generator 18 is employed in the image-reproducing device 14 as a color-switching signal for directing the beam onto the proper color phosphors in correspondence with the $R-B$ and $G-M$ color information modulating, respectively, the fundamental and second harmonic wave signals which intensity modulate such beam.

The line-frequency and field-frequency synchronizing components, after separation from other components in the unit 23, are utilized to synchronize the operations of the line-frequency generator 24 and the field-frequency generator 25 with the operations of corresponding units in the transmitter. The line-frequency and field-frequency signals developed, respectively, by the generators 24 and 25 are employed in the device 14 to effect, respectively, horizontal and vertical deflection of the electron beam therein to scan a raster on the image screen thereof. Such scanning operation combined with the color-switching operation and the intensity modulation of the electron beam by the luminance and color information result in a color reproduction of the televised image. A horizontal flyback pulse developed in the generator 24 is applied to the APC system 17 to render such system conductive during the period of the color burst synchronizing signal.

The intermediate-frequency sound signal developed in the source 10 is applied to the sound-signal reproducing unit 26 wherein it is further amplified and sound-signal components thereof derived. These derived components are amplified in an audio-frequency amplifier and utilized in a sound-signal reproducing device, such as a loudspeaker, to reproduce sound.

*Description of chrominance-signal selection system of Fig. 2*

Considering now in detail an embodiment of the chrominance-signal selection system such as represented by the $R-B$ and $G-M$ axis selector 19 of Fig. 1, more specifically the embodiment represented in Fig. 2, this selection system is effective to select desired chrominance components along nonquadrature axes of a chrominance subcarrier wave signal and includes means for supplying such a chrominance subcarrier wave signal. Preferably, the supply means comprises the circuit coupling an intensity control electrode 39 of a vacuum tube 30 to the output circuit of a chrominance subcarrier wave-signal source, for example, the band-pass filter network 15 of Fig. 1. This coupling circuit includes a coupling condenser 31 and a grid-leak resistor 32.

The system also includes a quadrature axis selector responsive to the subcarrier wave signal and having a pair of output circuits for developing therein components along different ones of a pair of quadrature axes of the wave signal. More specifically, the quadrature axis selector includes the tube 30 which is preferably, though not necessarily, of a beam-switching type, for example, a conventional 6AR8 type and further includes the circuits coupled to the electrodes thereof for conditioning the tube to effect quadrature axis selection. The tube includes a cathode 33 coupled through a biasing resistor 34 to a source of reference potential such as chassis-ground, a focusing electrode 35 connected to the same reference potential, and an accelerating electrode 36 coupled to a source of positive potential $+B_1$. In addition, the tube 30 includes a pair of deflection electrodes 37a and 37b coupled to a means for supplying a reference signal the frequency of which is twice that of the subcarrier wave signal. This reference signal, as will be explained more fully hereinafter, is so phased with respect to the subcarrier wave signal applied to the control electrode 39 as to effect development in a pair of anode output circuits of different phase portions of the chrominance subcarrier wave signal having axes in quadrature and individually modulated by different chrominance components. More specifically, the means for supplying the second harmonic reference signal comprises a transformer 40 having a resonant secondary circuit tuned approximately to 7.2 megacycles with the end terminals thereof individually coupled to different ones of the deflection electrodes 37a and 37b and a center tap connected to the reference potential, ground. The primary circuit of the transformer 40 is connected to the output circuit of the second harmonic amplifier 20 of Fig. 1.

The quadrature axis selector also includes a pair of output circuits, specifically anode output circuits, including anodes 38a and 38b having resonant load circuits 41a and 41b, respectively. Each of these load circuits resonates at approximately the frequency of the chrominance subcarrier wave signal and is coupled to a source of positive potential +B. The anode load circuits preferably, but by no means necessarily, include a multiresonant circuit 42 coupled therebetween. The circuit 42 is series resonant at approximately 7.2 megacycles for by-passing any of the second harmonic reference signals present in the anode circuits and is parallel resonant at the frequency of the chrominance subcarrier wave signal so as to have a high impedance for such wave signal and thereby minimize any by-passing or shunting of such signal.

The selection system also includes a phase-shift circuit having substantially a quadrature-phase shift at the frequency of the chrominance subcarrier wave signal and also having an asymmetrical signal-transfer impedance. The phase-shift circuit couples one output circuit to the other for combining in at least one thereof specific proportions of the components of the chrominance wave signal along the quadrature-phase axes, the combining signals having substantially the same phase to develop the desired nonquadrature chrominance components in the output circuits. More specifically, such phase-shift circuit includes, for example, a cathode-follower circuit 43 having a resonant cathode load circuit 44 for coupling some of the axis selected signal from the load circuit 41b into the load circuit 41a in order to modify the composition of the signal in the load circuit 41a to compensate for selection of this signal at an improper phase. The cathode-follower circuit 43 is provided to effect an asymmetrical transfer of signals from the load circuit 41b to the load circuit 41a with substantially no transfer occurring in the inverse direction. The load circuit 41b is coupled through a condenser 45 to the grid input circuit of the cathode follower 43. The cathode load circuit 44, parallel resonant at the frequency of the chrominance subcarrier wave signal, is connected in series with a variable resistor 46 between the cathode circuit of the cathode follower and the reference potential, ground. The resistor 46 is employed to control the magnitude of the signal coupled from the load circuit 41b to the load circuit 41a and may be dispensed with if the windings of the inductor in the circuit 44 are in the proper ratio to provide the proper magnitude of cross coupling or if other conventional means of effecting the desired degree of cross coupling are employed. The circuit 44 is inductively coupled to the load circuit 41a to effect a 90° shift in phase for any signal at the frequency of the chrominance subcarrier wave signal coupled from the circuit 44 to the load circuit 41a. The anode of the cathode follower is connected to a source of positive potential +B. The output load circuit 41a is coupled through a condenser 47a to the adder circuit 13 in Fig. 1 while the load circuit 41b is coupled through a corresponding condenser 47b to an input circuit of the modulator 21 in Fig. 1.

*Explanation of operation of chrominance-signal selection system of Fig. 2*

Considering now the operation of the selection system of Fig. 2, a chrominance subcarrier wave signal having a frequency of, for example, approximately 3.6 megacycles is translated through the filter network 15 and applied through the condenser 31 to the intensity control electrode 39 in the tube 30. A reference signal having twice the frequency of the subcarrier wave signal, that is, having a frequency of approximately 7.2 megacycles is developed in the amplifier 20 of Fig. 1 and applied through the transformer 40 of Fig. 2 to the beam deflection electrodes 37*a*, 37*b* of tube 30. The beam developed by the cathode 33 in the tube 30 is intensity modulated by the wave signal applied to the control electrode 39 and is directed toward the anodes 38*a* and 38*b* through the deflection field of the electrodes 37*a* and 37*b*. The 7.2 megacycle signal on the deflection electrodes 37*a* and 37*b* causes the beam alternately to impinge upon the anodes 38*a* and 38*b* at a 7.2 megacycle rate. This alternation causes the portions of the chrominance subcarrier wave signal along one phase axis to be developed in one of the anode circuits and the remaining portions along the axis in quadrature to be developed in the other anode circuit. If the desired chrominance information is along quadrature-phase axes and the reference signal applied to the deflection electrodes is properly phased with respect to the subcarrier wave signal applied to the control electrode 39, the signals developed in the two anode circuits are wave signals which include the information along the selected axes and, except as will be discussed hereinafter, substantially none of the information along the axes in quadrature with the selected axes. However, if the desired signals are not in quadrature but are at an acute angle, such as represented by the vectors of Fig. 3*a*, then one or both of the selected axes is in error and, therefore, the signals developed in one or both of the anode output circuits are contaminated by undesired components.

In employing a quadrature axis selector to select nonquadrature components, one selector axis can be aligned with that phase axis from which one of the desired signals is conventionally derived. For example, the axis selected in the anode load circuit 41*b* can be that coinciding with the $G-M$ derivation axis and substantially only information representative of $G-M$ will be developed in the load circuit 41*b*. However, if such axis selection is practiced, then the wave signal developed in the load circuit 41*a* includes not only information along that axis at which the $R-B$ signal would conventionally be derived but also a factor $-k(G-M)$ as represented by the vector diagram of Fig. 3*b*. The factor $-k(G-M)$ arises from the cross coupling of components from the $G-M$ modulation axis onto the axis at which the component $R-B$ is derived. The details need not be considered here but, in order that independent components $G-M$ and $R-B$ be conventionally derived from nonquadrature axes, the modulation axes for these components are such that the modulation axis for one is in quadrature with the derivation axis for the other. Consequently, where, as in the present case, the conventional derivation axis is not used for the $R-B$ component, the actual derivation axis is not in quadrature with the modulation axis of the $G-M$ component, cross coupling of $G-M$ into $R-B$ occurs, and the factor $-k(G-M)$ is present in the derived $R-B$ component. The undesired component $-k(G-M)$ can be canceled from the load circuit 41*a* by coupling a positive component $k(G-M)$, in phase with the axis developed in the load circuit 41*a*, into this load circuit. The cathode follower 43 and load circuit 44 effect such coupling.

The cathode follower 43 is responsive to the $G-M$ axis selected wave signal to develop a fraction of such wave signal in the cathode-circuit thereof. The fractional portion of the $G-M$ component, being trigonometrically determined to be approximately 0.38, is obtained either by adjustment of the resistor 46, by employing the proper turns ratio in the load circuit 44, or by other means. This fractional part of the $G-M$ wave signal is transferred through the load circuit 44 with a 90° phase shift so as to be in phase with the axis developed in the load circuit 41*a* and combined in phase with such axis selected signal to develop in the load circuit 41*a* an axis selected signal including substantially only $R-B$ information. This result is diagrammatically represented by the vector diagram of Fig. 3*c*. As a result, desired chrominance components which are along nonquadrature derivation axes, specifically $G-M$ and $R-B$ components separated by a phase angle of approximately 70°, are selected in an axis selector which conventionally would select information solely along quadrature axes. The axis selected signal in the load circuit 41*b* including substantially only $G-M$ information is in quadrature with the axis selected signal developed in the load circuit 41*a* including substantially only $R-B$ information.

*Description and explanation of operation of chrominance-signal selection system of Fig. 4*

In the embodiment of Fig. 2, one selection axis of the selector is aligned with the phase axis of a desired component of the subcarrier wave signal, specifically with the $G-M$ axis, so that only the signal selected by the other half of the axis selector is of improper composition. Unidirectional coupling is then employed to correct the composition of the latter signal. An embodiment of this type may require more circuit elements and place more constraints on the design engineer than are desirable. It is preferable to employ bidirectional cross coupling with asymmetrical transfer impedance properly proportoned to develop signals of the desired compositions in the two output circuits. By employing bidirectonal cross coupling, not only is it possible to derive output signals of proper signal composition but also such signals may be of increased magnitude by utilizing the type of cross coupling more fully described in a copending application Serial No. 473,916, now Patent No. 2,864,951, entitled "Chrominance-Signal Component-Selection System," filed by Bernard D. Loughlin on December 8, 1954. The embodiment of Fig. 4 is one in which bidirectional cross coupling is employed and augmented output signals of correct composition are obtained.

Since, except for the output circuits and the phase-shift circuits effecting cross coupling, the embodiment of Fig. 4 is identical with that of Fig. 2, the same circuit elements are identified by identical reference numerals. The pair of anode circuits in the embodiment of Fig. 4 are identified by reference numerals 50*a* and 51*a*. The phase-shift circuit in the embodiment of Fig. 4 for effecting quadrature-phase shift at the frequency of the subcarrier wave signal and having an asymmetrical signal-transfer impedance coupling the output circuits is provided by proportioning the relative impedances of the output circuits and by inductively coupling the windings therein. The inductive coupling of the two tuned load circuits provides the quadrature-phase shift and the different impedances of the load circuits provide the asymmetrical signal-transfer impedance so that more energy is coupled in one direction than in the other. In this way, axis selection of a modulated wave signal is effected along quadrature axes thereof, neither of which coincides with the axes of desired nonquadrature signals, by combining proper proportions of the pairs of quadrature axis selected signals in the two output circuits. Signals having the compositions of the desired nonquadrature signals are developed with augmented magnitudes in these two output circuits. The relative proportions of the pairs of quadrature axis selected signals, the relative impedances of the two load circuits, and the details of cross coupling to combine such proportions in the pairs of load circuits become more understandable by considering a simple mathematical analysis.

In the copending application Serial No. 473,916, now Patent No. 2,864,951, referred to above, there is described a symmetrical cross coupling of a pair of output circuits to obtain augmented signals of proper composition along a pair of quadrature axes different from the quadrature modulation axes of these signals. Though that application describes rotation of one set of quadrature axes to another quadrature set to obtain the augmented output, non-quadrature axes may be similarly rotated effectively to become a pair of quadrature axes having the desired nonquadrature signals augmented. For example, referring to the vector diagram of Fig. 4*a*, a pair of vectors A and B, which may represent, for example, respectively, the R—B and G—M derivation axes separated by approximately 70°, may be effectively rotated so that an augmented A coincides with the X axis and an augmented B coincides with the Y axis by combining a sufficient amount of Y with X along the X axis to define augmented A and similarly a sufficient amount of X with Y along the Y axis to define augmented B. The vector diagrams of Figs. 4*b* and 4*c* represent, respectively, augmented A and B on the X and Y axes, respectively. The X and Y axes are generalized quadrature axes representing any desired pair of quadrature modulation signals. Augmented A and B and the factors $k_1$ and $k_2$ may be defined as follows from the trigonometric relationships of the vectors in Fig. 4*a*:

$$A=X\cos\theta-Y\sin\theta \qquad (1)$$

or $$\frac{A}{\cos\theta}=X-Y\frac{\sin\theta}{\cos\theta} \qquad (2)$$

and $$B=X\cos\phi+Y\sin\phi \qquad (3)$$

or $$\frac{B}{\sin\theta}=Y+X\frac{\cos\theta}{\sin\theta} \qquad (4)$$

From these equations, augmented $A$ is $\frac{A}{\cos\theta}$, augmented $B$ is $\frac{B}{\sin\theta}$ $k_1$ is $\frac{\cos\theta}{\sin\theta}$, and $k_2$ is $\frac{\sin\theta}{\cos\theta}$ Having defined $k_1$ and $k_2$, it remains only that the relative impedances of the load circuits 50*a* and 51*a* and their asymmetrical cross coupling be such that the signal defined by Equation 2 be developed in the load circuit 50*a* and that defined by Equation 4 in the load circuit 51*a*. The cross coupling has to be such that a factor $k_1X$, specifically $$\frac{\cos\theta}{\sin\theta}X$$

is coupled from the load circuit 50*a* to the load circuit 51*a* and a factor $k_2Y$, specifically $$\frac{\sin\theta}{\cos\theta}Y$$

is coupled from the load circuit 51*a* to the load circuit 50*a*.

To define such impedances, conventional four-terminal network theory may be employed. The effective total impedance across the load circuit 50*a* may be designated by the symbol $R_{11}$ while the corresponding effective impedance for the load circuit 51*a* may be designated by the symbol $R_{22}$ and the transfer impedance from the input of one circuit to the output of the other circuit may be defined as $jM_{12}$ where the $j$ term represents the quadrature-phase shift. The anode current flowing into the load circuit 50*a* may be designated $i_X$ and the voltage developed across such load circuit, representing augmented A, may be designated $e_{11}$. Similarly, the anode current flowing into the load circuit 51*a* may be designated $i_Y$ and the voltage developed thereacross, representing augmented B, may be designated $e_{22}$. In view of their quadrature relation, the currents $i_X$ and $i_Y$ are definable as follows:

$$i_X=X+jO \qquad (5)$$

$$i_Y=O+jY \qquad (6)$$

The potentials $e_{11}$ and $e_{22}$, using the above relations, are then definable as follows:

$$e_{11}=i_XR_{11}+i_Y(jM_{12}) \qquad (7)$$

or $$e_{11}=XR_{11}-YM_{12} \qquad (8)$$

Similarly:

$$e_{22}=i_YR_{22}+i_X(jM_{12}) \qquad (9)$$

or $$e_{22}=j(YR_{22}+XM_{12}) \qquad (10)$$

Considering only the magnitudes $e_{11}$ and $e_{22}$, that is, ignoring the phase term and solving the last pair of equations to define the potentials $e_{11}$ and $e_{22}$ in forms corresponding to Equations 2 and 4 above, respectively, the following equations are obtained:

$$e_{11}=R_{11}\left(X-Y\frac{M_{12}}{R_{11}}\right) \qquad (11)$$

and $$e_{22}=R_{22}\left(Y+X\frac{M_{12}}{R_{22}}\right) \qquad (12)$$

From the latter pair of equations and the relationships defining $k_1$ and $k_2$, it is apparent that:

$$k_2=\frac{M_{12}}{R_{11}}=\frac{\sin\theta}{\cos\theta} \qquad (13)$$

and $$k_1=\frac{M_{12}}{R_{22}}=\frac{\cos\theta}{\sin\theta} \qquad (14)$$

Also, from Equations 13 and 14 above, the following relationship is defined:

$$\frac{R_{11}}{R_{22}}=\frac{k_1}{k_2} \qquad (15)$$

In other words, the impedances of the load circuits 50*a* and 51*a* should be in the ratio of the constants $k_1$ to $k_2$. To obtain the magnitude for the fraction $k_1/k_2$ closest to unity, and thus a preferred ratio of impedances, the angles $\phi$ and $\theta$ should be equal and critical coupling should be employed between the load circuits. Then, if the vectors A and B represent, respectively, the *R—B* and *G—M* derivation axes separated by approximately 70°, the constant $k_1$ becomes 1.43, the constant $k_2$ becomes 0.70, the augmentation of *R—B* is 0.22, and of *G—M* is 0.74. The impedance of the load circuit 51*a* is proportioned to provide a suitable anode load for the tube 30 and the impedance of the load circuit 50*a* is proportioned to be approximately twice that of the load circuit 51*a*. Critical coupling is employed between the two load circuits. With such proportioning, the signal developed in the load circuit 50*a* is a 3.58 megacycle wave signal modulated substantially only with *R—B* information and that in the load circuit 51*a* is modulated substantially only with *G—M* information. Any difference in the relative gains provided at the two output circuits is compensated for by adjusting the relative gains of the channels for the *R—B* and *G—M* signals.

The above explanation of the axis selectors of Figs. 2 and 4 assumes that the selections are mutually exclusive along the quadrature axes. In other words, it is assumed that there is no Y component in the selection along the X axis and no X component in the selection along the Y axis. However, in practice, when a 50 percent duty cycle for the pair of selections is utilized, as here, some X component is present in the selected Y signal and some Y component in the selected X signal. As more fully described in the copending application Serial No. 473,916, now Patent No. 2,864,951, referred to above, these undesired quadrature components in each of the selected signals can be canceled by making the phase shift effected by the cross-coupling circuit slightly more than 90° resulting, due to the misphasing, in the development of another quadrature component along each of the selected axes which is of sufficient magnitude to cancel the undesired component.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits for developing therein components along different ones of a pair of quadrature axes of said wave signal; and means including a phase-shift circuit responsive to said developed components having substantially a quadrature phase shift at the frequency of said wave signal and having an asymmetrical signal-transfer impedance coupling said output circuits for combining in at least one of said output circuits specific proportions of said components along said quadrature-phase axes with substantially the same phase to develop said desired chrominance components in said output circuits.

2. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits for developing therein components along different ones of a pair of quadrature axes of said wave signal; and means including a phase-shift circuit responsive to said developed components having substantially a quadrature phase shift at the frequency of said wave signal and having an asymmetrical signal-transfer impedance coupling said output circuits for combining in at least one of said output circuits specific proportions of said components along said quadrature-phase axes with substantially the same phase to develop in said output circuits along said quadrature axes said desired chrominance components.

3. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits for developing therein components along different ones of a pair of quadrature axes of said wave signal; and means including a phase-shift circuit responsive to said developed components having substantially a quadrature phase shift at the frequency of said wave signal and a unidirectionally conductive device for providing an asymmetrical signal-transfer impedance coupling said output circuits for combining in at least one of said output circuits specific proportions of said components along said quadrature-phase axes with substantially the same phase to develop said desired chrominance components in said output circuits.

4. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits of unequal impedances tuned approximately to the frequency of said subcarrier wave signal for developing therein components along different ones of a pair of quadrature axes of said wave signal; and means including a phase-shift circuit responsive to said developed components including said output circuits cross coupled to provide a quadrature phase shift at the frequency of said wave signal and an asymmetrical signal-transfer impedance between said output circuits for combining in both of said output circuits different specific proportions of said components along said quadrature-phase axes with substantially the same phase to develop said desired chrominance components in said output circuits.

5. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits resonant at approximately the frequency of said wave signal and having substantially different impedances for developing therein components along different ones of a pair of quadrature axes of said wave signal; and means including a phase-shift circuit responsive to said developed components including said output circuits inductively coupled with substantially critical coupling to provide a quadrature phase shift at the frequency of said wave signal and an asymmetrical signal-transfer impedance between said output circuits for combining in both of said output circuits different specific proportions of said components along said quadrature-phase axes with substantially the same phase to develop said desired chrominance components in said output circuits.

6. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits for developing therein components along different ones of a pair of quadrature axes of said wave signal, one of said quadrature and nonquadrature axes being substantially aligned; and means including a phase-shift circuit having substantially a quadrature phase shift at the frequency of said wave signal and having an asymmetrical signal-transfer impedance coupling said output circuits for combining substantially in phase a fraction of said component along said one quadrature axis with said component along the other of said quadrature axes to develop said desired chrominance components in said output circuits.

7. A chrominance-signal selection system for a color-television receiver for selecting desired chrominance components along nonquadrature axes of a chrominance subcarrier wave signal comprising: means for supplying such a chrominance subcarrier wave signal; means including a quadrature axis selector responsive to said subcarrier wave signal and having a pair of output circuits for developing therein components along different ones of a pair of quadrature axes of said wave signal, one of said quadrature and nonquadrature axes being substantially aligned; and means including a phase-shift circuit responsive to said developed components having a pair of inductively coupled resonant circuits for effecting substantially a quadrature phase shift at the frequency of said wave signal and a unidirectionally conductive device coupling said output circuits for combining in one of said output circuits and substantially in phase a fraction of said component along said one quadrature axis with said component along the other of said quadrature axes to develop said desired chrominance components in both said output circuits.

8. A chrominance-signal selection system for a color-television receiver for selecting desired chrominance components along nonquadrature axes of a chrominance subcarrier wave signal comprising: means for supplying such a chrominance subcarrier wave signal; means for supplying a locally generated signal the frequency of which is equal to the second harmonic of said wave signal and having a predetermined phase with respect to said wave signal; means including a quadrature axis selector including an electron-discharge device having a control electrode, a pair of anodes, and a pair of beam-deflecting electrodes, said control electrode being responsive to said subcarrier wave signal and said beam-deflecting electrodes being responsive to said locally generated signal for developing in said anodes components along different ones of a pair of quadrature axes of said wave signal; and means including a phase-shift circuit coupled between said anodes having substantially a quadrature phase shift at the frequency of said wave signal and having an asymmetrical signal-transfer impedance for combining in at least one of said anodes predetermined proportions of said components along said quadrature-phase axes with substantially the same phase to develop said desired chrominance components in said anodes.

9. A chrominance-signal selection system for a color-television receiver for selecting desired chrominance components along nonquadrature axes of a chrominance subcarrier wave signal comprising: means for supplying such a chrominance subcarrier wave signal; means for supplying a locally generated signal the frequency of which is equal to the second harmonic of said wave signal and having a predetermined phase with respect to said wave signal; means including a quadrature axis selector including an electron-discharge device having a control electrode, a pair of anodes, and a pair of beam-deflecting electrodes, said control electrode being responsive to said subcarrier wave signal and said beam-deflecting electrodes being responsive to said locally generated signal for developing in said anodes components along different ones of a pair of quadrature axes of said wave signal; and a pair of coupled circuits of unequal impedances resonant at the frequency of said wave signal and coupled to said anodes for effecting substantially a quadrature phase shift and an asymmetrical signal transfer of said developed components between said coupled circuits for combining in each of said coupled circuits predetermined proportions of said components along said quadrature-phase axes with substantially the same phase to develop said desired chrominance components in said coupled circuits.

10. A chrominance-signal selection system for a color-television receiver for selecting desired chrominance components along nonquadrature axes of a chrominance subcarrier wave signal comprising: means for supplying such a chrominance subcarrier wave signal; means for supplying a locally generated signal the frequency of which is equal to the second harmonic of said wave signal and having a predetermined phase with respect to said wave signal; means including a quadrature axis selector including an electron-discharge device having a control electrode, a pair of anodes, and a pair of beam-deflecting electrodes, said control electrode being responsive to said subcarrier wave signal and said beam-deflecting electrodes being responsive to said locally generated signal for developing in said anodes components along different ones of a pair of quadrature axes of said wave signal, one of said quadrature and nonquadrature axes being substantially aligned; and means including a phase-shift circuit coupled between said anodes having substantially a quadrature phase shift at the frequency of said wave signal and including a unidirectionally conductive device for combining in one of said anodes and substantially in phase a fraction of said component along said one quadrature-phase axis with said component along the other of said quadrature axes to develop said desired chrominance components in said anodes.

11. A chrominance-signal selection system for a color-television receiver for selecting desired chrominance components along nonquadrature axes of a chrominance subcarrier wave signal comprising: means for supplying such a chrominance subcarrier wave signal; means for supplying a locally generated signal the frequency of which is equal to the second harmonic of said wave signal and having a predetermined phase with respect to said wave signal; means including a quadrature axis selector including an electron-discharge device having a control electrode, a pair of anodes, and a pair of beam-deflecting electrodes, said control electrode being responsive to said subcarrier wave signal and said beam-deflecting electrodes being responsive to said locally generated signal for developing in said anodes components along different ones of a pair of quadrature axes of said wave signal, one of said quadrature and nonquadrature axes being substantially aligned; and means including a phase-shift circuit coupled between said anodes including a unidirectionally conductive device having an input circuit coupled to the one of said anodes in which said aligned axes occur and an output circuit and including a pair of coupled resonant circuits tuned to approximately the frequency of said wave signal, one of said resonant circuits being coupled to said output circuit and the other being coupled to the other of said anodes for translating with substantially a 90° phase shift a fraction of said developed component along said one quadrature axis for combining in said other anode predetermined proportions of said components along said quadrature-phase axes with substantially the same phase to develop said desired chrominance components in both said anodes.

References Cited in the file of this patent

UNITED STATES PATENTS

| | | |
|---|---|---|
| 2,680,147 | Rhodes | June 1, 1954 |
| 2,700,698 | Hammond | Jan. 25, 1955 |
| 2,725,422 | Stark | Nov. 29, 1955 |
| 2,732,425 | Pritchard | Jan. 24, 1956 |
| 2,759,993 | Loughlin | Aug. 21, 1956 |
| 2,779,818 | Adler | Jan. 29, 1957 |
| 2,798,201 | Moulton et al. | July 2, 1957 |
| 2,856,454 | Loughlin | Oct. 14, 1958 |

OTHER REFERENCES

Electronics, June 1954, pages 164–166. (Copy in U.S. Patent Office Library.)